(12) United States Patent
Togashi et al.

(10) Patent No.: US 8,058,835 B2
(45) Date of Patent: Nov. 15, 2011

(54) DEVICE AND METHOD FOR CONTROLLING OUTPUT OF RECHARGEABLE BATTERY

(75) Inventors: Kouta Togashi, Shizuoka (JP); Takuma Iida, Osaka (JP)

(73) Assignee: Panasonic EV Energy Co., Ltd., Shizuoka (JP)

( * ) Notice: Subject to any disclaimer, the term of this patent is extended or adjusted under 35 U.S.C. 154(b) by 650 days.

(21) Appl. No.: 11/611,765

(22) Filed: Dec. 15, 2006

(65) Prior Publication Data
US 2007/0138998 A1 Jun. 21, 2007

(30) Foreign Application Priority Data
Dec. 16, 2005 (JP) ................................ 2005-363639

(51) Int. Cl.
*H02J 7/00* (2006.01)
*B60L 1/00* (2006.01)

(52) U.S. Cl. ........ 320/104; 320/116; 320/132; 320/135; 307/10.1; 307/9.1

(58) Field of Classification Search .................. 320/104, 320/116, 132, 134, 118, 162, 148, 149, 135, 320/136
See application file for complete search history.

(56) References Cited

U.S. PATENT DOCUMENTS

| | | | | |
|---|---|---|---|---|
| 6,223,106 B1* | 4/2001 | Yano et al. | ...................... | 701/22 |
| 6,232,748 B1* | 5/2001 | Kinoshita | ..................... | 320/132 |
| 6,459,238 B2* | 10/2002 | Minamiura et al. | .......... | 320/125 |
| 6,956,298 B2* | 10/2005 | Kitajima et al. | ............. | 290/40 C |
| 2004/0021441 A1* | 2/2004 | Komiyama et al. | .......... | 320/104 |
| 2004/0257044 A1* | 12/2004 | Nagaoka | ....................... | 320/132 |
| 2005/0088139 A1* | 4/2005 | Frank | ........................... | 320/104 |
| 2005/0104558 A1* | 5/2005 | Murakami et al. | ............ | 320/125 |
| 2005/0151509 A1* | 7/2005 | Cook | ............................ | 320/116 |
| 2006/0077643 A1* | 4/2006 | Mayuzumi et al. | ........... | 361/753 |

FOREIGN PATENT DOCUMENTS

| | | |
|---|---|---|
| JP | 2002-195138 | 7/2002 |
| JP | 2003-314417 | 11/2003 |

* cited by examiner

*Primary Examiner* — Edward Tso
*Assistant Examiner* — Alexis Boateng
(74) *Attorney, Agent, or Firm* — Workman Nydegger (57) ABSTRACT

A controller and method for controlling output of a rechargeable battery that prevents the life span of the rechargeable battery from being shortened while ensuring starting of the engine. The rechargeable battery controller is mounted on a vehicle including an engine functioning as a power source. The controller includes a control unit for instructing a vehicle ECU, which is installed in the vehicle, to stop discharging the rechargeable battery when an index indicating the charged state of the rechargeable battery satisfies a discharge suspension condition. The control unit includes a monitor unit for changing the discharge suspension condition so as to continue discharging the rechargeable battery continues when the rechargeable battery is expected to supply power to the starter motor of the engine.

9 Claims, 9 Drawing Sheets

DEVICE AND METHOD FOR CONTROLLING OUTPUT OF RECHARGEABLE BATTERY

CROSS-REFERENCE TO RELATED APPLICATIONS

This application is based upon and claims the benefit of priority from the prior Japanese Patent Application No. 2005-363639, filed on Dec. 16, 2005, the entire contents of which are incorporated herein by reference.

BACKGROUND OF THE INVENTION

The present invention relates to a device and a method for controlling the output of a rechargeable battery mounted on a vehicle.

A hybrid electric vehicle (HEV) using an engine and a motor as a power source has been put to practical use and is becoming popular. An HEV includes a rechargeable battery functioning as a power supply for supplying power to the motor.

When the engine outputs more power than necessary to drive the vehicle, the HEV drives its generator using the excessive power to charge the rechargeable battery. When the vehicle is braking or decelerating, the HEV drives the motor with the vehicle wheels and charges the rechargeable battery using the motor as a power generator. When the engine outputs less power than necessary, the HEV compensates for the lack of power by discharging the rechargeable battery and driving the motor.

In this way, the HEV accumulates energy in the rechargeable battery. Conventional automobiles release such energy into the atmosphere as heat. The energy efficiency of an HEV is higher than the energy efficiency of a conventional automobile. Thus, the HEV greatly improves fuel efficiency as compared with conventional automobiles.

An HEV supplies power to a starter motor, which is used to start the engine, with the rechargeable battery that supplies power to the drive motor. However, in the rechargeable battery, the discharge voltage or state of charge (SOC) greatly decreases at low temperatures of zero degrees Celsius or lower. The HEV may not be able to start the engine under such circumstances. Japanese Laid-Open Patent Publication No. 2002-195138 describes a controller (hereinafter referred to as "battery ECU") for a rechargeable battery that limits the output of the discharged power to ensure starting of the engine under low temperatures.

Specifically, the battery ECU sets the minimum voltage of the rechargeable battery for driving the starter motor. If the discharge voltage that was greater than or equal to the minimum voltage when activating the starter motor becomes lowers than the minimum voltage, the battery ECU temporarily stops the supply of power. As discharge current generates heat in the battery and increases the discharge voltage, the battery ECU allows power to be supplied again to the starter motor. The battery ECU performs such a process before the engine starts. Therefore, in the above publication, the battery ECU ensures the starting of the engine under low temperatures by repeatedly stopping and starting discharge of the rechargeable battery.

The rechargeable battery mounted on the HEV is normally formed by connecting a plurality battery cells in series. If the capacity of each battery cell varies, the discharge capability of each battery cell also varies. As a result, excess discharge of a battery cell having a lowered capacity causes polarity inversion. Repeated starting and stopping of discharge within a short period of time also results in a tendency for polarity inversion to occur. Thus, in the invention of the above publication that repeatedly activates and inactivates the starter motor, the possibility of rise in the frequency of polarity inversion increases. This shortens the life span of the rechargeable battery.

SUMMARY OF THE INVENTION

The present invention provides a controller for the rechargeable battery and method for controlling the rechargeable battery that suppresses shortening of the life time of the rechargeable battery while ensuring ability for the starting of the engine.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

In the drawings, like numerals are used for like elements throughout.

One aspect of the present invention is a controller for a rechargeable battery mounted on a vehicle using an engine as a power source. The vehicle includes a starter motor for starting the engine and a vehicle controller for controlling the starter motor. The controller includes a control unit that when operated instructs the vehicle controller to stop discharging the rechargeable battery when an index indicating a charged state of the rechargeable battery satisfies a discharge suspension condition, and moderates the discharge suspension condition when the rechargeable battery is expected to supply power to the starter motor.

In the controller, the index indicating the charged state of the rechargeable battery includes terminal voltage of the rechargeable battery. The discharge suspension condition includes a lower limit value for the terminal voltage of the rechargeable battery. The control unit lowers the lower limit value of the terminal voltage to moderate the discharge suspension condition.

In the controller, the index indicating the charged state of the rechargeable battery includes a state of charge of the rechargeable battery. The discharge suspension condition includes a lower limit value for the state of charge of the rechargeable battery. The control unit lowers the lower limit value of the state of charge to moderate the discharge suspension condition.

In the controller, the index indicating the charged state of the rechargeable battery includes terminal voltage and state of charge of the rechargeable battery. The discharge suspension condition includes lower limit values for the terminal voltage and state of charge of the rechargeable battery. The control unit lowers the lower limit values of the terminal voltage and state of charge of the rechargeable battery to moderate the discharge suspension condition.

In the controller, the rechargeable battery has a temperature, and the control unit moderates the discharge suspension condition if the temperature of the rechargeable battery is lower than or equal to a predetermined temperature when the rechargeable battery is expected to supply power to the starter motor.

In the controller, the control unit includes a monitor unit for changing the discharge suspension condition so as to continue discharging the rechargeable battery when the rechargeable battery is expected to supply power to the starter motor.

In the controller, the control unit includes a setting unit for setting a first upper limit value and a second upper limit value, which is lower than the first upper limit value, for power discharged from the rechargeable battery within a predetermined time. The discharge suspension condition includes a first condition for generating an instruction based on the first upper limit value to stop discharging the rechargeable battery and a second condition for generating an instruction based on the second upper limit value to stop discharging the rechargeable battery. The control unit moderates at least the first condition.

In the controller, the first upper limit value is set to be higher than the power required to be discharged when starting the engine.

In the controller, the control unit moderates the first condition during a period in which an engine start signal provided from the vehicle controller to the rechargeable battery controller is active.

A further aspect of the present invention is a method for controlling output of a rechargeable battery mounted on a vehicle using an engine as a power source. The vehicle includes a starter motor for starting the engine and a vehicle controller for controlling the starter motor. The method includes determining whether an index indicating a charged state of the rechargeable battery satisfies a discharge suspension condition, instructing the vehicle controller to stop discharging the rechargeable battery when the index indicating the charged state of the rechargeable battery satisfies the discharge suspension condition, determining whether the rechargeable battery is expected to supply power to the starter motor, and moderating the discharge suspension condition when the rechargeable battery is expected to supply power to the starter motor.

In the method, the index indicating the charged state of the rechargeable battery includes terminal voltage of the rechargeable battery, the discharge suspension condition includes a lower limit value for the terminal voltage of the rechargeable battery, and said moderating the discharge suspension condition includes lowering the lower limit value of the terminal voltage.

In the method, the index indicating the charged state of the rechargeable battery includes a state of charge of the rechargeable battery, the discharge suspension condition includes a lower limit value for the state of charge of the rechargeable battery, and said moderating the discharge suspension condition includes lowering the lower limit value of the state of charge.

In the method, the index indicating the charged state of the rechargeable battery includes terminal voltage and state of charge of the rechargeable battery, the discharge suspension condition includes lower limit values for the terminal voltage and state of charge of the rechargeable battery, and said moderating the discharge suspension condition includes lowering the lower limit values of the terminal voltage and state of charge of the rechargeable battery.

The present invention may be a computer-readable product encoded with a program for embodying the output controlling method of the rechargeable battery. The output controlling method of the rechargeable battery according to the present invention is performed by installing the program in a computer and executing the program.

The controller 1 for the rechargeable battery 40 and a method for controlling the output of the rechargeable battery 40 according to a first embodiment of the present invention will now be described with reference to FIGS. 1 to 5.

Figure 1:
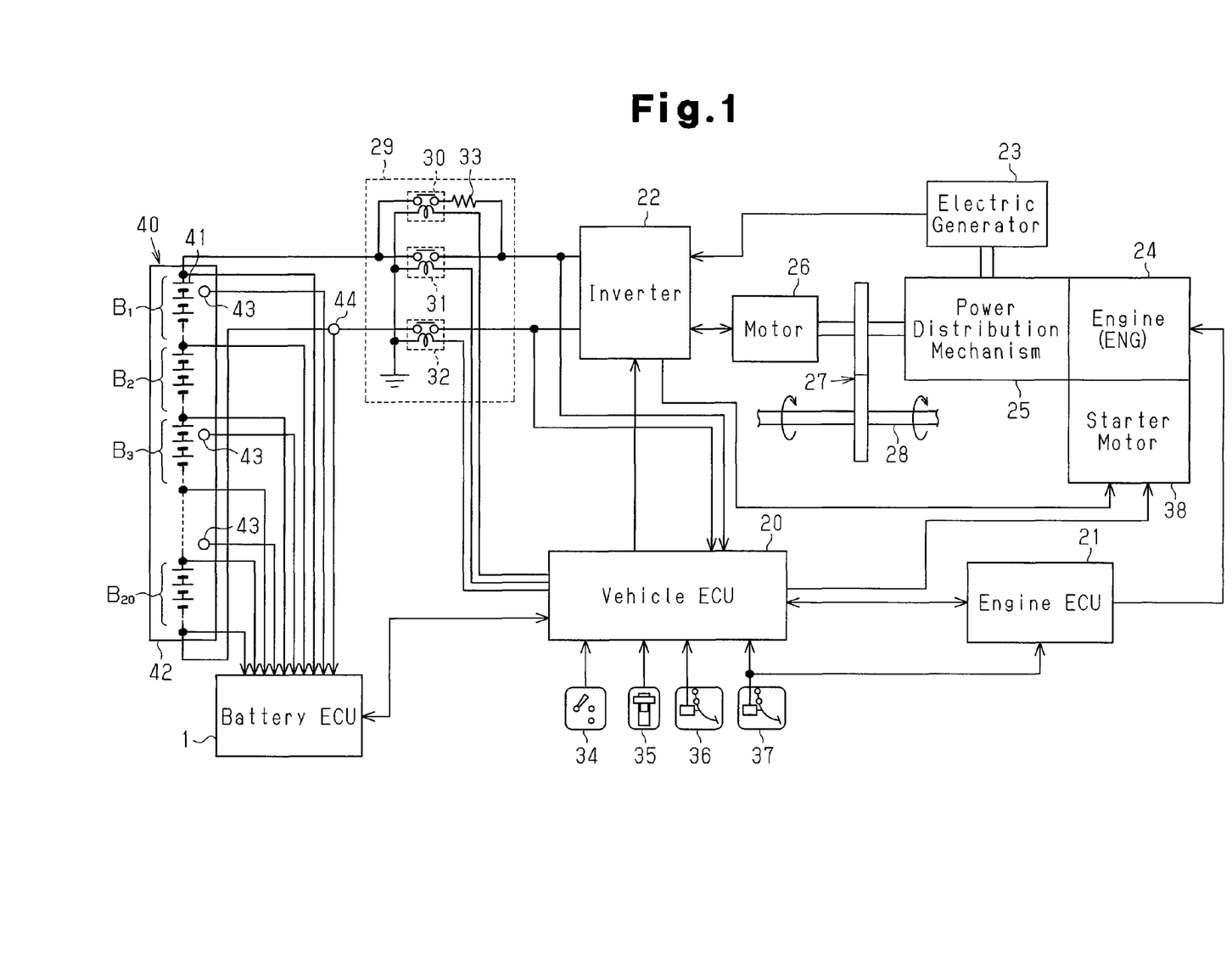
FIG. 1 is a schematic block diagram showing an electrical configuration of a vehicle including a controller for the rechargeable battery (battery ECU) according to a first embodiment of the present invention.

FIG. 1 is a schematic block diagram showing an electrical configuration of a vehicle including a controller 1 for the rechargeable battery 40.

As shown in FIG. 1, the vehicle including the controller 1 for the rechargeable battery 40 is an HEV. The vehicle includes an internal combustion engine 24 and a motor 26, which function as a power source for transmitting power to a drive shaft 28. The drive shaft 28 is connected to vehicle wheels (not shown). When the vehicle is motor-driven, the rechargeable battery 40 functions as a power supply source for the motor 26.

The rechargeable battery 40 supplies power to the motor 26 via a relay unit 29 and an inverter 22. The rechargeable battery 40 also supplies power to a starter motor 38 for starting the engine 24 via the relay unit 29 and the inverter 22. The inverter 22 converts direct current from the rechargeable battery 40 to alternating current for driving the motor 26. The wiring connecting the inverter 22 and the starter motor 38 is not shown in FIG. 1.

The engine 24 transmits power to the vehicle wheels via a power distribution mechanism 25, a decelerator 27, and a drive shaft 28. The motor 26 transmits power to the vehicle wheels via the decelerator 27 and the drive shaft 28. The power of the engine 24 is partially transmitted to an electric generator 23 via the power distribution mechanism 25 when the rechargeable battery 40 requires charging.

The power generated by the electric generator 23 is supplied to charge the rechargeable battery 40 via the inverter 22 and the relay unit 29. The motor 26 is used as an electric generator when the electric vehicle is decelerating or braking.

The power generated by the motor 26 is also supplied to charge the rechargeable battery 40 via the inverter 22 and the relay unit 29.

The relay unit 29 includes relays 30 to 32, and a resistor 33. The relay 31 is connected between a positive terminal of the rechargeable battery 40 and a high potential input terminal of the inverter 22. The relay 32 is connected between a negative terminal of the rechargeable battery 40 and the low potential input terminal of the inverter 22. The relay 30 is connected in series with the resistor 33 and in parallel with the relay 31. The relay 30 is used with the resistor 33 to precharge a smoothing capacitor (not shown) of the inverter 22 when activating the vehicle.

The electric motor vehicle includes a controller (battery ECU) 1 for the rechargeable battery 40, a controller for the vehicle (vehicle ECU) 20, and a controller for the engine (engine ECU) 21. The engine ECU 21 mainly controls the ignition period and the fuel injection amount of the engine 24. The battery ECU 1 mainly performs measurement of the terminal voltage, measurement of the current, measurement of the temperature, calculation of SOC (State Of Charge), deterioration determination of the rechargeable battery 40, and transmits information on the results of each process to the vehicle ECU 20. The specific configuration and function of the battery ECU 1 will now be described with reference to FIG. 2.

The vehicle ECU 20 controls the motor 26 and the starter motor 38 by controlling the inverter 22 based on the information provided from devices such as the battery ECU 1 and the engine ECU 21. The information provided from the engine ECU 21 includes the operating state of the engine 24 and the rotational angle of the crankshaft. The information provided from the battery ECU 1 includes information related to the SOC of the rechargeable battery 40 and the upper limit value of the discharging power of the rechargeable battery 40. Information indicating the operation amount of an accelerator pedal 37, the operation amount of a brake pedal 36, and the gearshift range selected by a gearshift lever 35 are also provided to the vehicle ECU 20 and used to control the inverter 22.

The vehicle ECU 20 supplies starting voltage (minimum operation voltage) from the rechargeable battery 40 to the relays 30 to 32 to activate the relays 30 to 32. The vehicle ECU 20 also suspends the supply of starting voltage to inactivate the relays 30 to 32. Specifically, the vehicle ECU 20 first activates the relay 30 and the relay 32 when the ignition (IG) 34 is switched to the engine start position (IG-ON). This precharges the smoothing capacitor of the inverter 22. Then, when the precharging is terminated, the vehicle ECU 20 activates the relay 31. Consequently, the power of the rechargeable battery 40 is supplied to the motor 26 via the inverter 22. The vehicle ECU 20 suspends the supply of the starting voltage when detecting that the ignition 34 has been switched to the OFF position.

When detecting that the ignition 34 has been switched to the ON position, the vehicle ECU 20 transmits a signal indicating the detection result to the battery ECU 1 before supplying the starting voltage to the relays 30 to 32. When detecting that the ignition 34 has been switched to the OFF position, the vehicle ECU 20 transmits a signal indicating the detection result to the battery ECU 1 and simultaneously suspends the supply of the starting voltage.

Further, although not shown in the drawings, a relay for activating and inactivating the starter motor 38 is arranged on the wiring connecting the starter motor 38 and the inverter 22. After detecting the IG-ON position and activating the relays 30 to 32, the vehicle ECU 20 supplies the starting voltage from the rechargeable battery 40 to the starter motor relay and activates this relay. Power is then supplied to the starter motor 38, and the engine is started by the driving force of the starter motor 38. Furthermore, the vehicle ECU 20 provides the engine start signal to the battery ECU 1 when detecting the IG-ON position.

In the first embodiment, the rechargeable battery 40 includes battery blocks $B_1$ to $B_{20}$ connected in series. The battery blocks $B_1$ to $B_{20}$ are accommodated in a battery case 42. Each battery block $B_1$ to $B_{20}$ is formed by electrically connecting two battery modules in series. Furthermore, each battery module is formed by electrically connecting six battery cells 41 in series. Each battery cell 41 is a nickel-metal hydride battery, a lithium ion battery, or the like. The number of battery blocks, the number of battery modules, and the number of battery cells 41 are not particularly limited. The connection of the rechargeable battery 40 is also not limited to the above example.

A plurality of temperature sensors 17 are arranged in the battery case 42. The plurality of temperature sensors 43 are arranged so that each temperature sensor 43 is associated with either a battery block group of battery blocks having relatively close temperatures or a battery block group of battery blocks having relatively large temperature differences. The grouping of the battery blocks is based on the temperatures of the battery blocks measured in advance through experiments etc.

Figure 2:
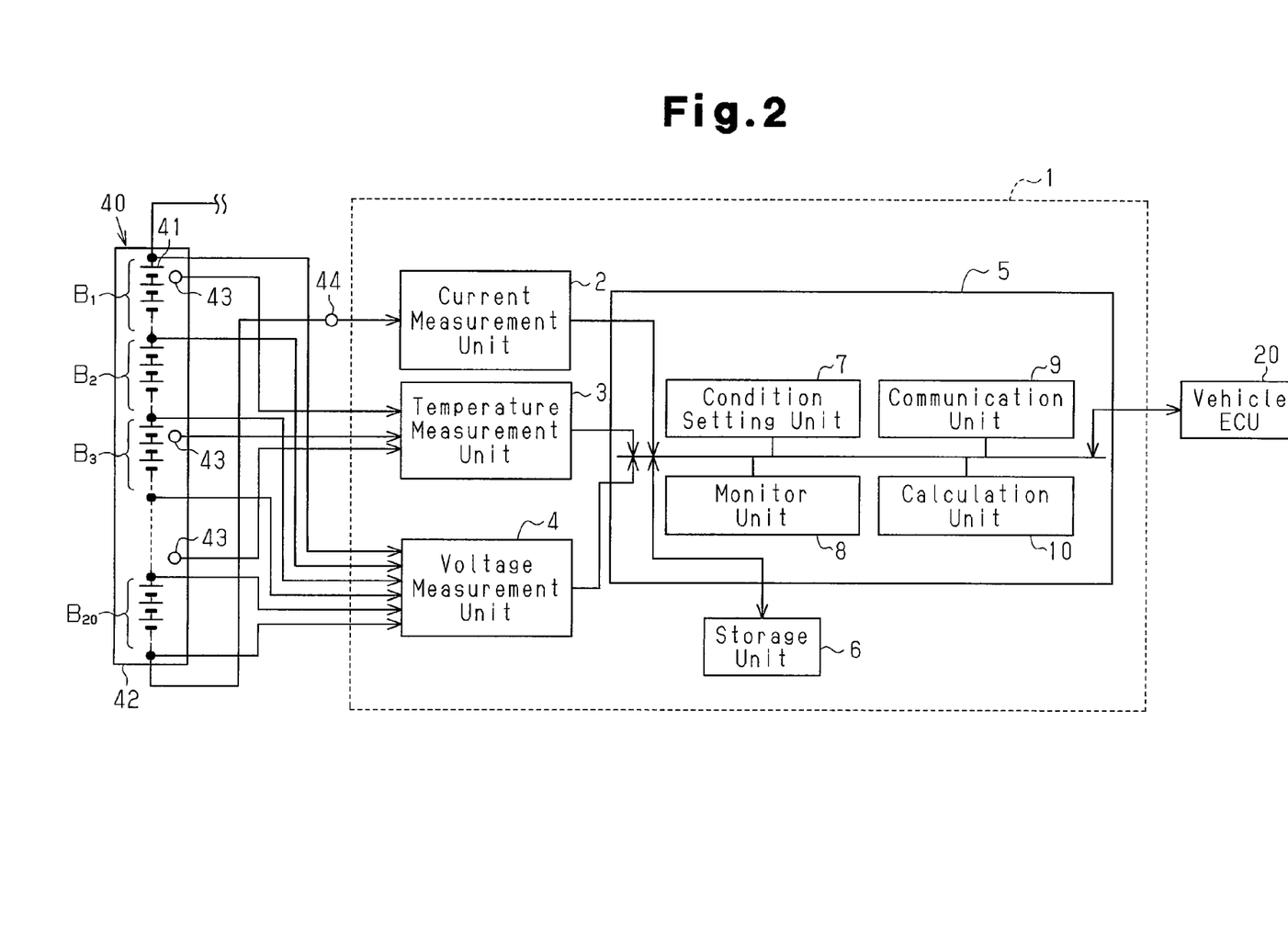
FIG. 2 is a schematic block diagram of the battery ECU of FIG. 1.

The configuration of the controller 1 for the rechargeable battery 40 of the first embodiment will now be described with reference to FIG. 2. FIG. 2 is a block diagram schematically showing the configuration of the battery ECU 1 shown in FIG. 1. As shown in FIG. 2, the battery ECU 1 includes a current measurement unit 2, a voltage measurement unit 4, a temperature measurement unit 3, a control unit 5, and a storage unit (memory) 6.

The voltage measurement unit 4 measures the terminal voltage of the rechargeable battery 40. In the first embodiment, the voltage measurement unit 4 measures terminal voltages (block voltages) $V_{u1}$ to $V_{u20}$ of the respective battery blocks $B_1$ to $B_{20}$. The voltage measurement unit 4 then generates voltage data indicating each terminal voltage $V_{u1}$ to $V_{u20}$ and provides the voltage data to the control unit 5. The voltage measurement unit 4 provides the voltage data to the control unit 5 in predetermined cycles. The control unit 5 stores the received voltage data in the storage unit 6.

The current measurement unit 2 measures the current value I of the charge current and the current value I of the discharge current of the rechargeable battery 40. In the first embodiment, the current measurement unit 2 converts the analog signal provided from the current sensor 44 to a digital signal. The current measurement unit 2 then generates current data indicating the current value I of the current charged in the rechargeable battery 40 during charging and the current value I of the current discharged from the rechargeable battery 40 during discharging based on the digital signal and provides the current data to the control unit 5. The current measurement unit 2 generates the current data with the current value during charging as a negative value and the current value during discharging as a positive value. The current measurement unit 2 provides the current data to the control unit 5 in predetermined cycles. The control unit 5 stores the received current data in the storage unit 6.

The temperature measurement unit 3 measures the temperature of the rechargeable battery 40. In the first embodiment, the temperature measurement unit 3 receives an analog signal from the temperature sensor 43, which are respectively associated with the groups of battery blocks, and converts the analog signal to a digital signal. The temperature measurement unit 3 then generates temperature data indicating the battery temperature for each group based on the digital signal and provides the temperature data to the control unit 5. The temperature measurement unit 3 provides the temperature data to the control unit 5 in predetermined cycles. The control unit 5 stores the received temperature data in the storage unit 6.

The control unit 5 includes a condition setting unit 7, a monitor unit 8, a communication unit 9, and a calculation unit 10. In the first embodiment, the condition setting unit 7 sets the upper limit value of the discharging power that can be supplied from the rechargeable battery 40 within a predetermined time. Specifically, the condition setting unit 7 sets a short term output upper limit (hereinafter referred to as first upper limit value) Pp and a long term output upper limit (hereinafter referred to as second upper limit value) Pn. The first upper limit value Pp and the second upper limit value Pn set by the condition setting unit 7 are respectively stored in the storage unit 6 as short term output information and long term output information.

The first upper limit value Pp indicates the upper limit value of the discharging power that can be supplied from the rechargeable battery 40 within a short predetermined time of, for example, one to two seconds. The first upper limit value Pp is used to limit the discharge of the rechargeable battery when the rechargeable battery 40 is required to output a high discharge within a short period of time such as when the vehicle starts to move, when a gear is shifted, or when the engine is started. The second upper limit value Pn indicates the upper limit of the discharging power that can be supplied from the rechargeable battery 40 in a relatively long period of time of, for example, ten seconds. The second upper limit value Pn is used to limit the discharge of the rechargeable battery when, for example, the vehicle is traveling in a stable state.

In the first embodiment, the condition setting unit 7 sets the first upper limit value Pp and the second upper limit value Pn using a two-dimensional map of which the parameters are the battery temperature and the SOC. Specifically, in the two-dimensional map, the optimal upper limit value is recorded at an intersection of a vertical axis (or horizontal axis) indicating the battery temperature and the horizontal axis (or the vertical axis) indicating the SOC. Each optimal value of the first upper limit value Pp and the second upper limit value Pn recorded on the two-dimensional map is obtained in advance through experiments. The two-dimensional map is stored in the storage unit 6. The condition setting unit 7 specifies the lowest battery temperature (minimum battery temperature) in the battery temperatures of the battery block groups based on the temperature data. The condition setting unit 7 applies the minimum battery temperature and the SOC estimated by the calculation unit 10 to the two-dimensional map to set the optimal first upper limit value Pp and the second upper limit value Pn.

Furthermore, in the first embodiment, the condition setting unit 7 also sets a short term discharge limiting voltage (hereinafter referred to as first limiting voltage) $V_1$ and a short term discharge suspension voltage (hereinafter referred to as first suspension voltage) $V_2$ ($V_1 > V_2$) for the first upper limit value Pp. The condition setting unit 7 also sets a long term discharge limiting voltage (hereinafter referred to as second limiting voltage) $V_{11}$ and a long term discharge suspension voltage (hereinafter referred to as second suspension voltage) $V_{12}$ ($V_{11} > V_{12}$) for the second upper limit value Pn.

Each of the first limiting voltage $V_1$ and the second limiting voltage $V_{11}$ is set as a trigger voltage when the monitor unit 8 lowers the first upper limit value Pp and the second upper limit value Pn. Each of the first suspension voltage $V_2$ and the second suspension voltage $V_{12}$ is set as a trigger voltage when the monitor unit 8 suspends discharging.

The storage unit 6 stores a map showing the correlation between the temperature and the first limiting voltage $V_1$ optimal for that temperature and a map showing the correlation between the temperature and the first suspension voltage $V_2$ optimal for that temperature. Also, the storage unit 6 stores a map showing the correlation between the temperature and the second limiting voltage $V_{11}$ optimal for that temperature and a map showing the correlation between the temperature and the second suspension voltage $V_{12}$ optimal for that temperature. The condition setting unit 7 sets the first limiting voltage $V_1$, the first suspension voltage $V_2$, the second limiting voltage $V_{11}$, and the second suspension voltage $V_{12}$ by applying the minimum battery temperature to each map.

Each map is generated taking into account the performance and load of the rechargeable battery 40 based on results of discharging experiments performed in advance. In particular, the map specifying the first suspension voltage $V_2$ and the map specifying the second suspension voltage $V_{12}$ are generated so as to avoid the occurrence of polarity inversion in the battery cells 41 of the rechargeable battery 40.

The monitor unit 8 lowers the upper limit value to suppress a decrease in the terminal voltage of the rechargeable battery 40 when the terminal voltage of the rechargeable battery 40 decreases to the discharge limiting voltage. The monitor unit 8 also stops the discharge when the terminal voltage of the rechargeable battery 40 further decreases and reaches the discharge suspension voltage.

Figure 3:
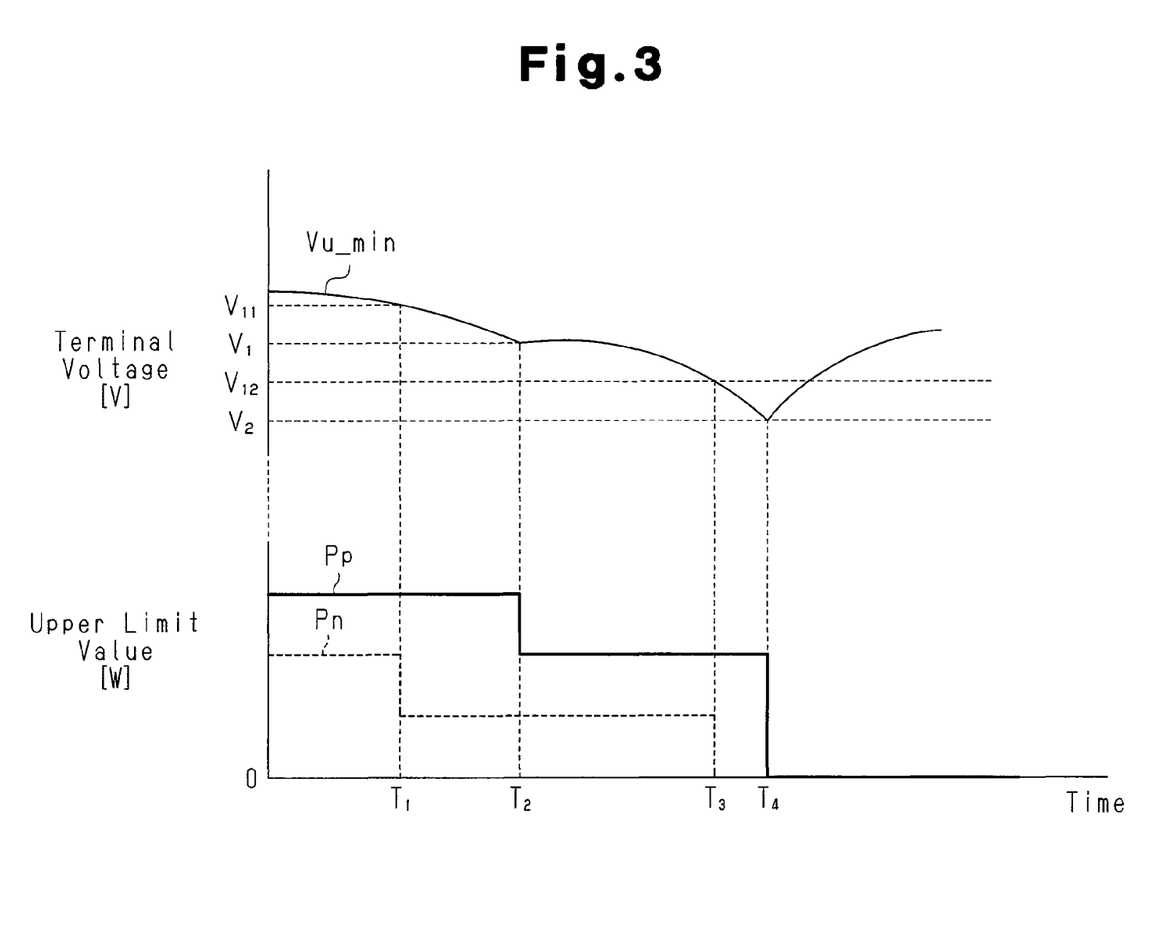
FIG. 3 is a graph showing changes in terminal voltage of the rechargeable battery when an upper limit lowering process is performed by a monitoring section of FIG. 2.

FIG. 3 is a graph showing changes in the terminal voltage of the rechargeable battery 40 when the upper limit value is lowered by the monitor unit 8 of FIG. 2.

First, the monitor unit 8 specifies the lowest terminal voltage (minimum terminal voltage) Vu_min in the terminal voltages $V_{u1}$ to $V_{u20}$ measured for the battery blocks. As shown at time $T_1$ of FIG. 3, when Vu_min decreases to the second limiting voltage $V_{11}$, the monitor unit 8 resets the second upper limit value Pn to a value that is one step smaller and lowers the second upper limit value Pn. The monitor unit 8 also rewrites the long term output information to information corresponding with the second upper limit value Pn.

Next, as shown at time $T_2$ of FIG. 3, when Vu_min decreases to the first limiting voltage $V_1$, the monitor unit 8 resets the first upper limit Pp to a value one step smaller and lowers the first upper limit value Pp. The monitor unit 8 also rewrites the short term output information to information corresponding to the first upper limit value Pp. The lowering width of each of the second upper limit value Pn and the first upper limit value Pp is set in accordance with the performance of the rechargeable battery 40 and the lowering speed of the voltage and is not particularly limited.

As shown at time $T_3$ of FIG. 3, when Vu_min decreases to the second suspension voltage $V_{12}$, the monitor unit 8 determines to suspend the discharge for the long term, resets the second upper limit value Pn to zero (0) and rewrites the long term output information. Furthermore, as shown at time $T_4$ of FIG. 3, when Vu_min decreases to the first suspension voltage $V_2$, the monitor unit 8 determines to suspend the discharge for the short term, resets the first upper limit value Pp to zero (0), and rewrites the short term output information.

In this manner, the monitor unit 8 lowers the first upper limit value Pp and the second upper limit value Pn in accordance with the decrease in the terminal voltage of the rechargeable battery 40 to suppress the lowering of the terminal voltage. The monitor unit 8 also suspends the discharge when the terminal voltage of the rechargeable battery 40 further decreases to a predetermined suspension voltage to suppress deterioration of the rechargeable battery. The monitor unit 8 performs the above processes constantly or in regular intervals.

However, if the monitor unit 8 performs the process shown in FIG. 3 in the same manner as under normal temperatures even though the terminal voltage of the rechargeable battery decreases under low temperatures such as zero degrees Celsius or lower, power would not be supplied to the starter motor 38, and the engine 24 may not be started. Thus, in the first embodiment, the monitor unit 8 lowers the respective values of the first limiting voltage $V_1$ and the first suspension voltage $V_2$ particularly when starting the engine. This will be described with reference to FIG. 4. In the first embodiment, the first limiting voltage $V_1$ after being lowering is referred to as "the short term discharge limiting voltage $V\alpha$ (first limiting voltage $V\alpha$)" and the first suspension voltage $V_2$ after being lowered is referred to as "the short term discharge suspension voltage $V\beta$ (first suspension voltage $V\beta$)".

Figure 4:
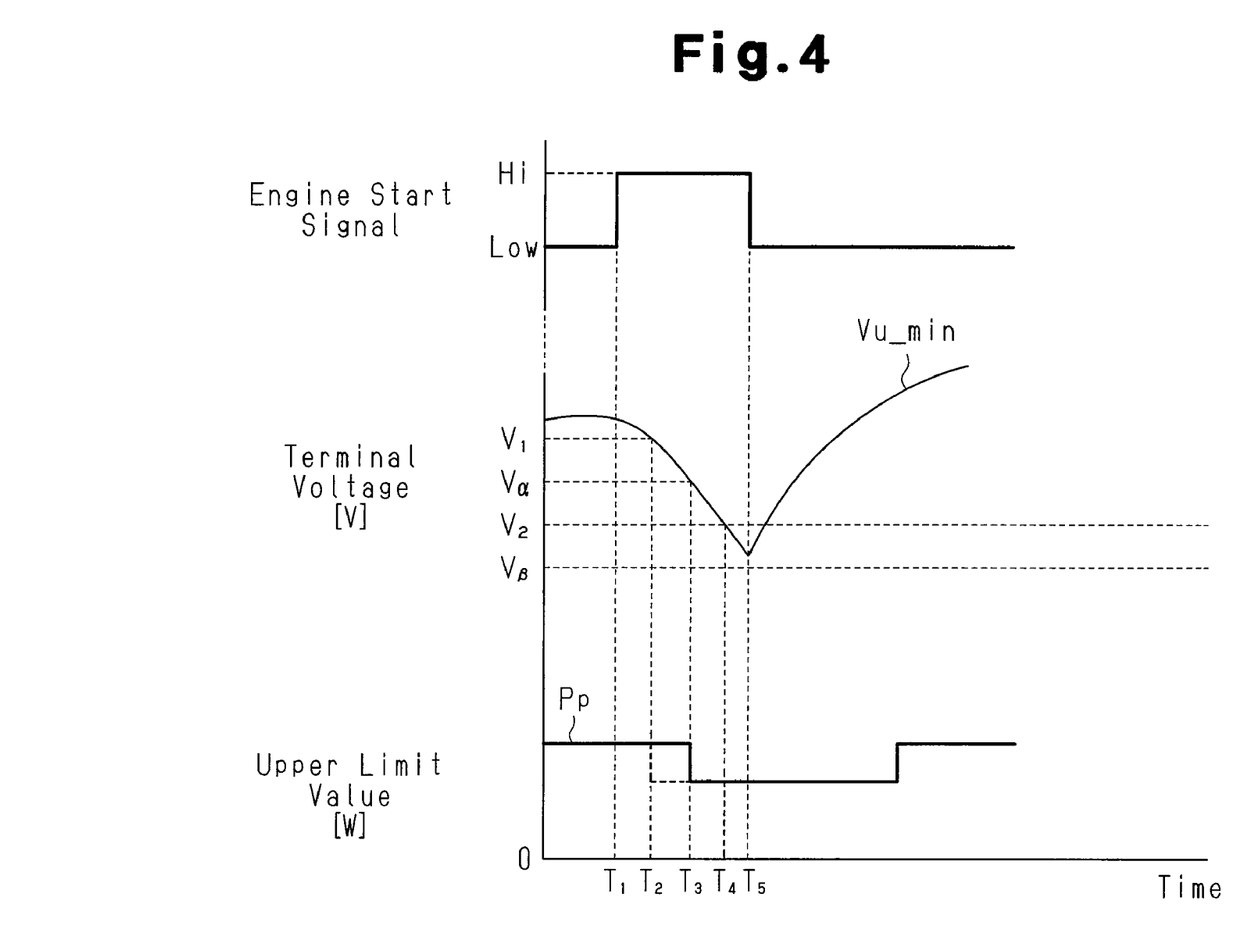
FIG. 4 is a graph showing the change in the terminal voltage of the rechargeable battery with respect to a short term discharge limiting voltage and a short term discharge suspension voltage of when the upper limit lowering process by the monitoring section of FIG. 2 is performed in time of engine start.

FIG. 4 is a graph showing changes in the terminal voltage of the rechargeable battery 40 with respect to the first limiting voltage and the first suspension voltage of when the upper limit value is lowered by the monitor unit 8 of FIG. 2 during the starting of the engine. As shown in FIG. 4, the monitor unit 8 lowers the first limiting voltage from $V_1$ to $V\alpha$ and lowers the first suspension voltage from $V_2$ to $V\beta$ when the supply of power to the starter motor 38 (see FIG. 1) by the rechargeable battery 40 is expected, specifically, when the engine start signal is provided from the vehicle ECU 20 to the battery ECU 1. The monitor unit 8 preferably lowers the first limiting voltage and the first suspension voltage to $V\alpha$ and $V\beta$, respectively, in the period from time $T_1$ to $T_5$ shown in FIG. 4 when the logic level of the engine start signal is switched from low to high.

Therefore, as shown in FIG. 4, the first upper limit value Pp cannot be lowered (see $T_2$) even if the minimum terminal voltage Vu_min decreases to the first limiting voltage $V_1$. When Vu_min decreases to the first limiting voltage $V\alpha$, the first upper limit value Pp is lowered for the first time (see $T_3$) The discharge is not suspended even if Vu_min is decreased to the first suspension voltage $V_2$ by the supply of power to the starter motor 38. That is, the discharge is not suspended unless Vu_min decreases to the first suspension voltage $V\beta$. Therefore, the supply of power to the starter motor 38 is continued.

As a result, the reliability of the starting of the engine is improved even under low temperatures. The lowering width of the first limiting voltage $V_1$ and the first suspension voltage $V_2$ is appropriately set so as to avoid the occurrence of polarity inversion in each battery cell 41 of the rechargeable battery 40, while taking into account the performance of the rechargeable battery 40.

The communication unit 9 transmits the first upper limit value Pp and the second upper limit value Pn to the vehicle ECU 20 mounted on the vehicle. In the first embodiment, the communication unit 9 transmits the short term output information (information corresponding to the first upper limit value Pp) and the long term output information (information corresponding to the second upper limit value Pp) stored in the storage unit 6 to the vehicle ECU 20. The short term output information and the long term output information are transmitted to the vehicle ECU 20 in regular time intervals or whenever the monitor unit 8 performs a lowering or raising process.

When the short term output information and the long term output information are provided to the vehicle ECU 20, the use of the rechargeable battery 40 by the vehicle ECU 20 is restricted to the first upper limit value Pp and the second upper limit value Pn. That is, the vehicle ECU 20 uses the rechargeable battery 40 within the range of the first upper limit value Pp specified by the short term output information or within the range of the second upper limit value Pn specified by the long term output information to control the driving of the motor 26 (see FIG. 1) and the starter motor 38 (see FIG. 1).

The calculation unit 10 estimates the SOC of the rechargeable battery 40. The estimated SOC is transmitted to the vehicle ECU 20 by the communication unit 9. In the first embodiment, the calculation unit 10 estimates the first SOC based on the accumulated capacitance Q of the rechargeable battery 40. The calculation unit 10 also estimates the second SOC based on the charge and discharge history. Furthermore, the calculation unit 10 obtains the difference between the first SOC and the second SOC, corrects the first SOC based on the obtained difference, and acquires the corrected first SOC as the SOC of the rechargeable battery 40.

Specifically, the estimation of the first SOC is performed through the following procedures. First, the calculation unit 10 reads the current data stored in the storage unit 6, acquires the current value I, and multiplies the current value I with the charging efficiency when the acquired current value I is negative during charging. The calculation unit 10 then accumulates the obtained current value I (multiplied value during charging) over a predetermined time to calculate the accumulated capacitance Q. The calculation unit 10 further obtains the difference between the capacitance in a state of full charge, which is obtained in advance through experiments, and the accumulated capacitance Q. The calculation unit 10 then obtains the ratio of the obtained difference with respect to the capacitance in a state of full charge and estimates the obtained ratio [%] as the first SOC.

The estimation of the second SOC is performed through the following procedures. First, the calculation unit 10 acquires two pieces of data, the voltage value of the terminal voltage and either the current value I of the charge current or the discharge current for each battery block, from the voltage data provided from the voltage measurement unit 4 and the current data provided from the current measurement unit 2 within a predetermined period of time. The two acquired pieces of data are stored in the storage unit 6 as charge and discharge history.

The calculation unit 10 then selects the average pair data excluding the upper limit and the lower limit of the representative battery block from the two pieces of data for each block stored in the storage unit 6. Furthermore, the calculation unit 10 obtains a primary approximation line (V-I approximation line) by performing a regression analysis on the two pieces of selected data. The calculation unit 10 then acquires the V segment of the V-I approximation line as a non-load voltage OCV of a representative battery block.

The calculation unit 10 estimates the polarization voltage of the rechargeable battery 40 based on the amount of change ΔQ per predetermined period (or unit time) of the accumulated capacitance Q. Specifically, the calculation unit 10 performs a time delay process and an averaging process on the amount of change ΔQ to eliminate variation components corresponding to unnecessary high frequency components of ΔQ and calculates ΔQ'. The calculation unit 10 applies the calculated amount of change ΔQ' and the minimum battery temperature to the two-dimensional map that represents the polarization voltage at the intersection of the vertical axis (or horizontal axis) indicating the temperature and the horizontal axis (or the vertical axis) indicating ΔQ' to specify the polarization voltage. The calculation unit 10 estimates the specified polarization voltage as the polarization voltage of the rechargeable battery 40. This two-dimensional map is also stored in the storage unit 6.

The calculation unit 10 subtracts the estimated polarization voltage from the non-load voltage OCV of the representative battery block to calculate the electromotive force of the representative battery block. The calculation unit 10 also applies the calculated electromotive force and the minimum battery temperature to the two-dimensional map that represents the SOC at the intersection of the vertical axis (or the horizontal axis) indicating the temperature and the horizontal axis (or the vertical axis) indicating the electromotive force to specify the SOC and estimates such SOC as the second SOC. This two-dimensional map is also stored in the storage unit 6.

In the above example, the calculation unit 10 selects a representative battery block and calculates the OCV but is not limited in such a manner. For example, the calculation unit 10 may calculate the electromotive force of the entire rechargeable battery from the non-load voltage of the entire rechargeable battery to estimate the second SOC.

Figure 5:
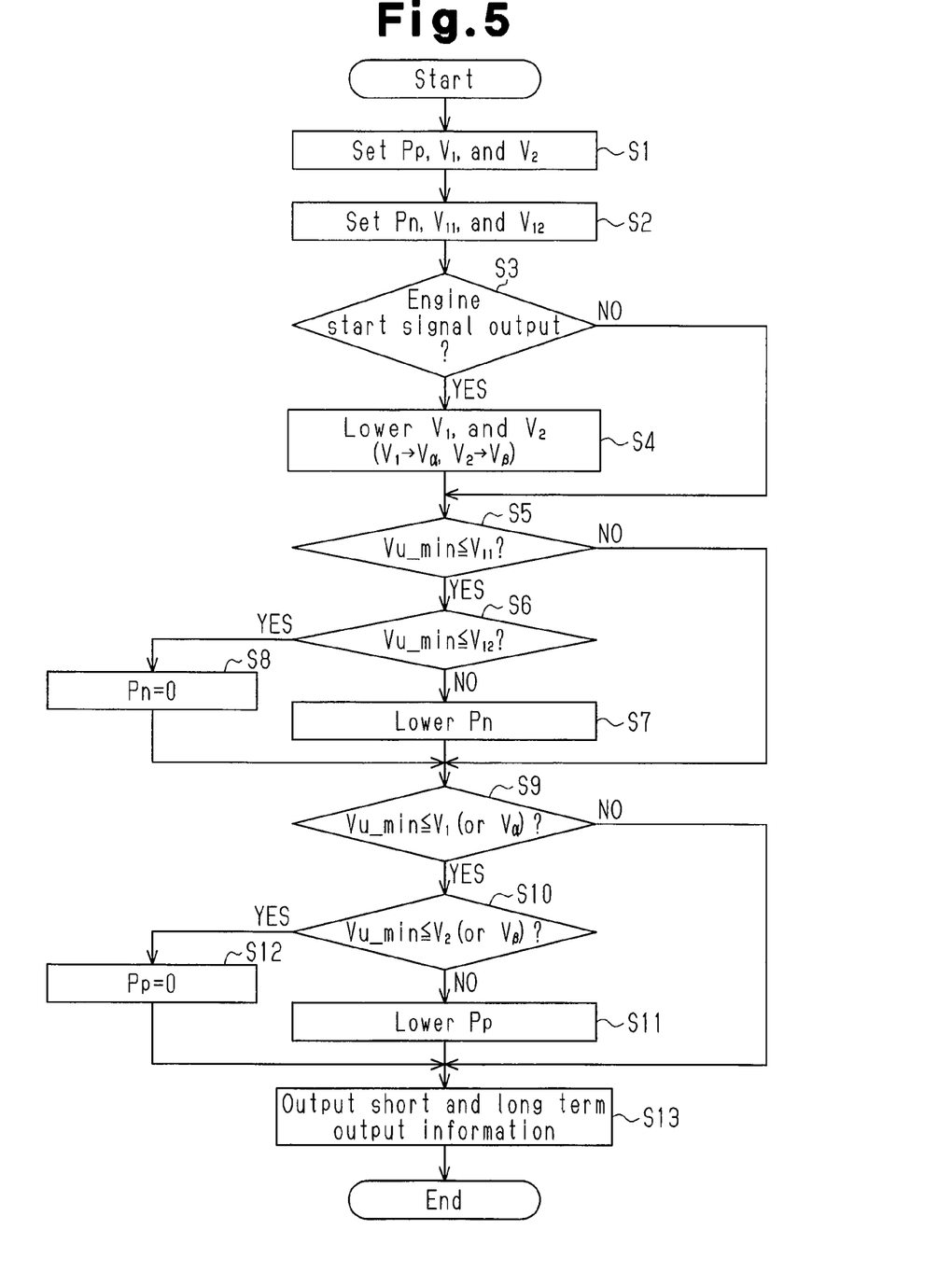
FIG. 5 is a flowchart showing an output control method of the rechargeable battery performed by the battery ECU of FIG. 2.

The output controlling method of the rechargeable battery 40 of the first embodiment will now be described with reference to FIG. 5. FIG. 5 is a flowchart showing the output controlling method of the rechargeable battery 40 of the first embodiment. The output controlling method of the rechargeable battery 40 of the first embodiment is performed by operating the battery ECU (battery controller) 1 shown in FIGS. 1 and 2.

As shown in FIG. 5, the condition setting unit 7 first sets the short term output upper limit value (first upper limit value) Pp, the short term discharge limiting voltage (first limiting voltage) $V_1$, and the short term discharge suspension voltage (first suspension voltage) $V_2$ (step S1) The condition setting unit 7 then sets the long term output upper limit value (second upper limit value) Pn, the long term discharge limiting voltage (second limiting voltage) $V_{11}$, and the long term discharge suspension voltage (second suspension voltage) $V_{12}$ (step S2). The steps S1 and S2 may be performed simultaneously or in a reversed order.

The monitor unit 8 determines whether or not the engine start signal is output from the vehicle ECU 20 (step 3). If the engine start signal is output, the monitor unit 8 lowers the first limiting voltage $V_1$ to the first limiting voltage $V\alpha$ and lowers the first suspension voltage $V_2$ to the second suspension voltage $V\beta$ (step S4). Then, the monitor unit 8 proceeds to step 5. If the engine start signal is not output, the monitor unit 8 performs step S5 without lowering the first limiting voltage $V_1$ or the first suspension voltage $V_2$.

In step S5, the monitor unit 8 determines whether or not the minimum terminal voltage Vu_min is less than or equal to the second limiting voltage $V_{11}$. If the minimum terminal voltage Vu_min is not less than or equal to the second limiting voltage $V_{11}$, the monitor unit 8 proceeds to step S9. If the minimum terminal voltage Vu_min is less than or equal to the second limiting voltage $V_{11}$, the monitor unit 8 determines whether or not the minimum terminal voltage Vu_min is less than or equal to the second suspension voltage $V_{12}$ (step S6).

If determined in step S6 that the minimum terminal voltage Vu_min is less than or equal to the second suspension voltage $V_{12}$, the monitor unit 8 sets the second upper limit value Pn to 0 (zero) to suspend the discharge for a long term (step S8) and then proceeds to step S9. If determined in step S6 that the minimum terminal voltage Vu_min is not less than or equal to the second suspension voltage $V_{12}$, the monitor unit 8 lowers the second upper limit value Pn by one step (step S7) and then proceeds to step S9.

In step S9, the monitor unit 8 determines whether or not the minimum terminal voltage Vu_min is less than or equal to the first limiting voltage $V_1$. However, if step S4 is performed, the monitor unit 8 determines whether or not the minimum terminal voltage Vu_min is less than or equal to the first limiting voltage $V\alpha$ in step S9.

When the minimum terminal voltage Vu_min is not less than or equal to the first limiting voltage $V_1$ (or $V\alpha$), the monitor unit 8 performs step S13. When the minimum terminal voltage Vu_min is less than or equal to the first limiting voltage V1 (or $V\alpha$), the monitor unit 8 determines whether or not the minimum terminal voltage Vu_min is less than or equal to the first suspension voltage V2 (step S10). However, the monitor unit 8 determines whether or not the minimum terminal voltage Vu_min is less than or equal to the first suspension voltage $V\beta$ in step S10 if step S4 is performed.

If determined in step S10 that the minimum terminal voltage Vu_min is less than or equal to the first suspension voltage $V_2$ (or $V\beta$), the monitor unit 8 sets the first upper limit value Pp to 0 (zero) to suspend discharge for the short term (step S12). If determined in step S10 that the minimum terminal voltage Vu_min is not less than or equal to the first suspension voltage $V_2$ (or $V\beta$), the monitor unit 8 lowers the first upper limit value Pp by one step (step S11).

Subsequently, the communication unit 9 provides the short term output information and the long term output information to the vehicle ECU 20 (step S13) and then terminates processing. In the first embodiment, the processes from steps S1 to S13 shown in FIG. 5 are performed in constant cycles (e.g., 100 ms cycles).

Therefore, according to the first embodiment, the first limiting voltage $V_1$ and the first suspension voltage $V_2$ are lowered to $V\alpha$ and $V\beta$, respectively, when the engine is started, and the discharge limiting condition and the discharge suspension condition are moderated compared to normal states. As a result, the first upper limit value Pp is lowered only when an index (block voltage of the rechargeable battery 40) indicating the charged state of the rechargeable battery 40 satisfies the discharge suspension condition (lower limit value: $V\beta$), which is lower than that for normal states. Thus, this improves the reliability of the starting of the engine under low temperatures. Since the power necessary for engine start is ensured by lowering the first suspension voltage, the engine is started without having to repeatedly activate and inactivate the starter motor 38. Thus, the deterioration of the rechargeable battery 40 is suppressed compared to the prior art.

Although not shown in FIG. 5, the monitor unit 8 may also determine whether or not the battery temperature of the rechargeable battery 40 is lower than or equal to a constant value (e.g. zero degrees) in step S3 of the first embodiment. In this case, step S4 is performed only under low temperatures. Thus, deterioration of the rechargeable battery 40 is further suppressed.

In the first embodiment, the programs embodying various processes shown in FIG. 5 may be installed in a microcomputer, and the battery ECU 1 may execute the programs installed in the microcomputer. In this case, a CPU (central processing unit) of the microcomputer functions as the control unit 5. The connecting circuit of the voltage sensor and the CPU function as the voltage measurement unit 4, the connecting circuit of the current sensor 44 and the CPU function as the current measurement unit 2, and the connecting circuit of the temperature sensor 43 and the CPU function as the temperature measurement unit 3. Furthermore, various memories arranged in the microcomputer function as the storage unit 6.

In the field of HEV, the vehicle ECU may function as the battery ECU. In this case, the programs embodying various processes shown in FIG. 5 are installed in the microcomputer configuring the vehicle ECU 20 and executed by the battery ECU 1.

A second embodiment of the present invention will now be described with reference to FIGS. 6 to 8.

The rechargeable battery subject to control in the second embodiment is similar to the rechargeable battery 40 of the first embodiment shown in FIGS. 1 and 2. The controller for the rechargeable battery of the second embodiment, which is similar to the controller 1 for the rechargeable battery 40 of the first embodiment shown in FIGS. 1 and 2, is mounted on the HEV. To avoid redundancy, like or same reference numerals are given to those components that are the same as the corresponding components of the first embodiment.

Figure 6:
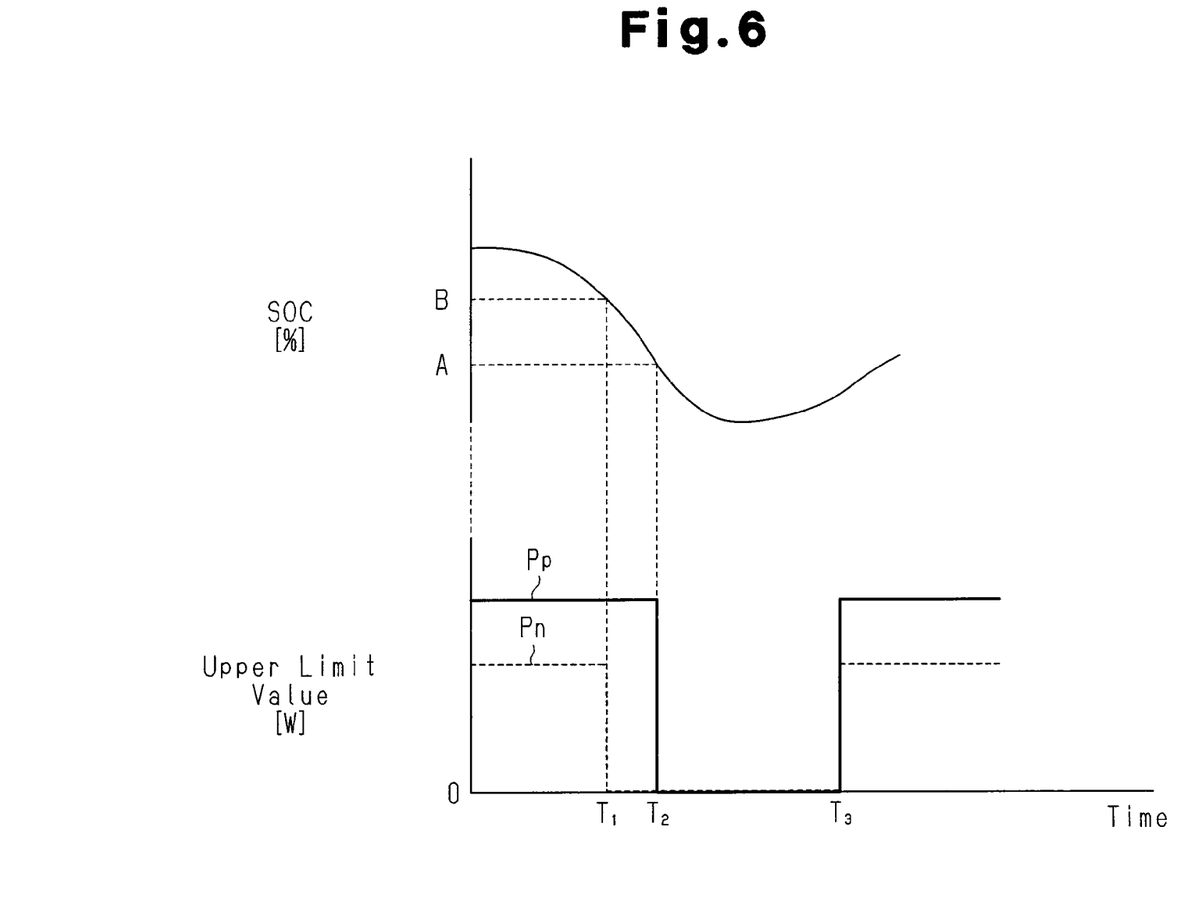
FIG. 6 is a graph showing changes in the SOC of the rechargeable battery when an upper limit lowering process value is performed according to a second embodiment of the present invention.

FIG. 6 is a graph showing changes in the SOC of the rechargeable battery 40 when the upper limit value is lowered by the monitor unit 8 of the second embodiment. FIG. 7 is a graph showing changes in the SOC of the rechargeable battery 40 with respect to the short term discharge stop SOC when the upper limit value is lowered by the monitor unit 8 of the second embodiment in time of engine start.

Figure 7:
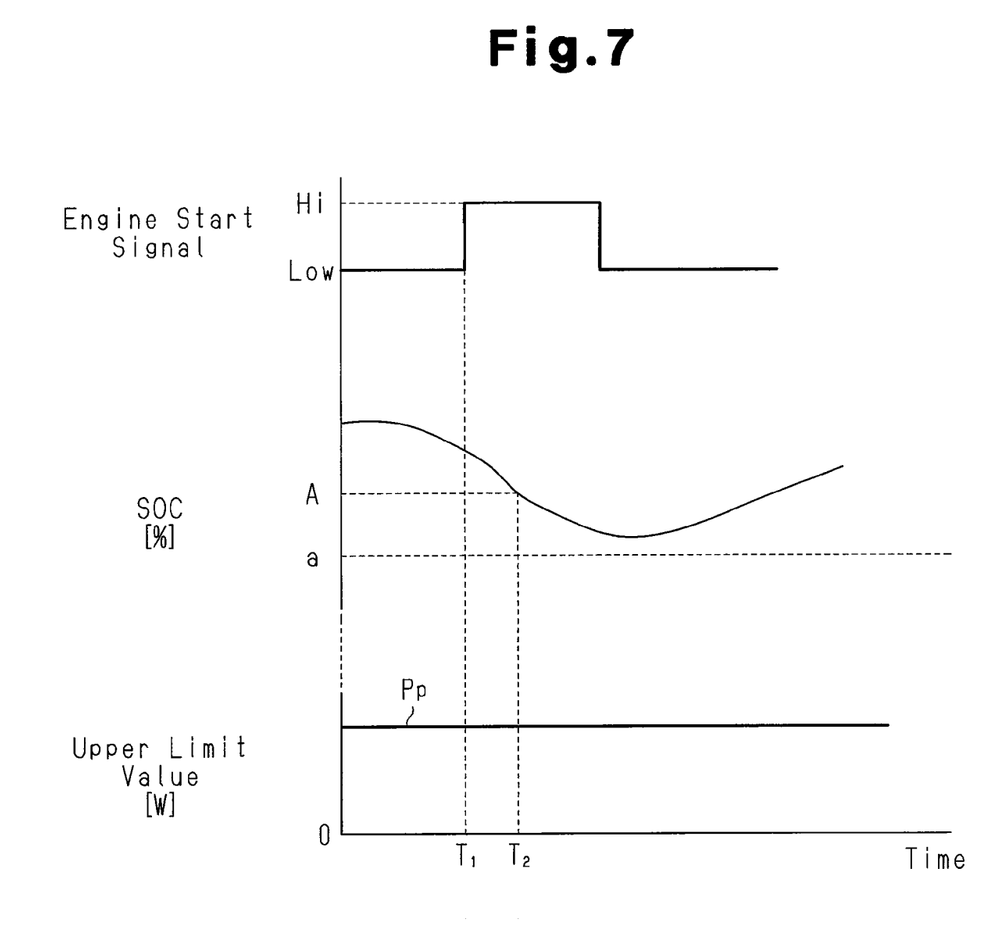
FIG. 7 is a graph showing changes in the SOC of the rechargeable battery during a short term discharge suspension SOC when the engine is being started in the second embodiment.

As shown in FIGS. 6 and 7, the SOC of the rechargeable battery 40 is used as an index indicating the charged state of the rechargeable battery 40. Discharging is suspended when the SOC of the rechargeable battery 40 decreases to a predetermined value.

Specifically, in the second embodiment, the condition setting unit 7 sets the short term discharge suspension SOC (hereinafter referred to as first suspension SOC) and the long term discharge suspension SOC (hereinafter referred to as second suspension SOC) instead of the short term discharge suspension voltage (first suspension voltage) and the long term discharge suspension voltage (second suspension voltage) of the first embodiment as the trigger for stopping the discharge. The storage unit 6 stores a map showing the correlation between the temperature and the first suspension SOC optimal for that temperature and a map showing the correlation between the temperature and the second suspension SOC optimal for that temperature. The condition setting unit 7 applies the minimum battery temperature specified from the temperature data to each map to set the first suspension SOC and the second suspension SOC.

Thus, as shown in FIG. 6, the monitor unit 8 determines to suspend discharge in the long term when the value of the SOC of the rechargeable battery 40 decreases to value B of the second suspension SOC and resets (see $T_1$) the second upper limit value Pn to 0 (zero). The monitor unit 8 further determines to suspend discharge in the short term when the value of the SOC of the rechargeable battery 40 decreases to the value A of the first suspension SOC and resets (see $T_2$) the first upper limit value Pp to 0 (zero).

However, it becomes difficult to start the engine when the SOC of the rechargeable battery 40 decreases under low temperatures. Thus, the monitor unit 8 lowers the value of the first suspension SOC particularly when starting the engine in the second embodiment.

For example, as shown in FIG. 7, the monitor unit 8 lowers the value of the first suspension SOC from A to a (A>a) when the logic level of the engine start signal switches from low to high. As a result, the discharge is not suspended even if the value of the SOC of the rechargeable battery 40 decreases to A by the power supply to the starter motor 38, as shown in FIG. 7. That is, discharge is not suspended unless the value of the SOC decreases to a. Therefore, the supply of power to the starter motor 38 is continued.

Consequently, the reliability of the starting of the engine is improved even under low temperatures. The lowering width of the first suspension SOC is set so as to avoid the occurrence of polarity inversion in the battery cells of the rechargeable battery 40 taking into account the performance of the rechargeable battery 40.

The output controlling method of the rechargeable battery 40 of the second embodiment will now be described with reference to FIG. 8. FIG. 8 is a flowchart showing the output controlling method of the rechargeable battery 40 of the second embodiment. The output controlling method of the rechargeable battery 40 in the second embodiment is performed by operating the battery ECU 1 (battery controller) of the second embodiment.

Figure 8:
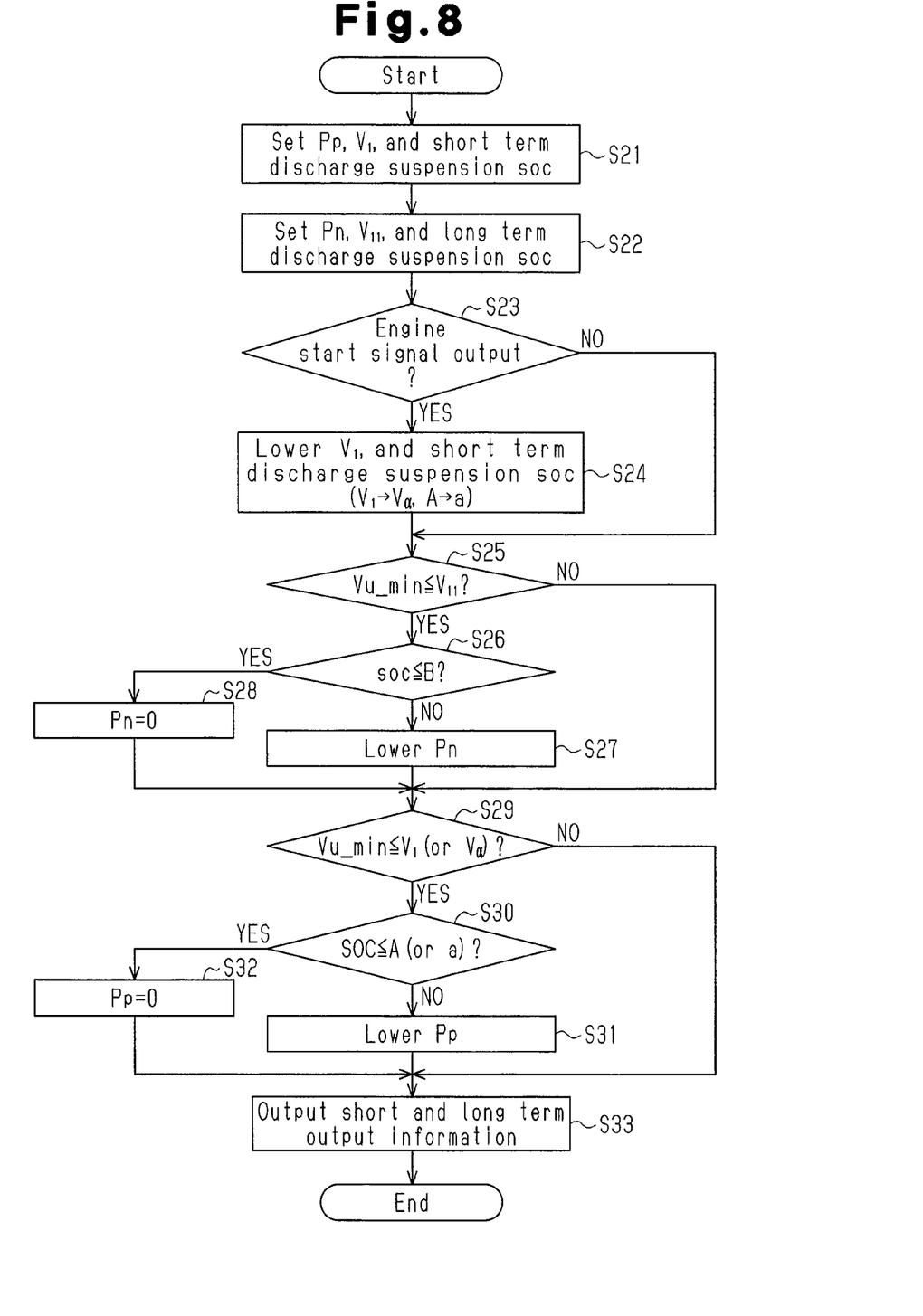
FIG. 8 is a flowchart showing an output controlling method of the rechargeable battery in the second embodiment.

As shown in FIG. 8, the condition setting unit 7 first sets the short term output upper limit value (first upper limit value) Pp, the short term discharge limiting voltage (first limiting voltage) $V_1$, and the short term discharge suspension SOC (first suspension SOC) (step S21). The condition setting unit 7 also sets the long term output upper limit value (second upper limit value) Pn, the long term discharge limiting voltage (second limiting voltage) $V_{11}$, and the long term discharge suspension SOC (first suspension SOC) (step S22). Steps S21 and S22 may be performed simultaneously or in a reversed order. The value of the first suspension SOC is set to A in step S21, and the value of the second suspension SOC is set to B in step S22.

The monitor unit 8 determines whether or not the engine start signal is output from the vehicle ECU 20 (step S23). Step S23 is similar to step S3 of the first embodiment shown in FIG. 5.

When the engine start signal is output, the monitor unit 8 lowers the value of the first suspension SOC from A to a (step S24) and then proceeds to step S25. In step S24, the monitor unit 8 lowers the value of the first limiting value $V_1$ in the same manner as in step S4 of the first embodiment. When the engine start signal is not output, the monitor unit 8 performs step S25 without lowering the first suspension SOC. The lowered first limiting voltage is set as the "first limiting voltage $V\alpha$".

In step S25, the monitor unit 8 determines whether or not the minimum terminal voltage Vu_min is less than or equal to the second limiting voltage $V_{11}$. If the minimum terminal voltage Vu_min is not less than or equal to the second limiting voltage $V_{11}$, the monitor unit 8 performs step S29. If the minimum terminal voltage Vu_min is less than or equal to the second limiting voltage $V_{11}$, the monitor unit 8 determines whether or not the value of the SOC of the rechargeable battery 40 is less than or equal to the value B of the second suspension SOC (step S26).

If determined in step S26 that the value of the SOC of the rechargeable battery 40 is less than or equal to the value B of the second suspension SOC, the monitor unit 8 sets the second upper limit value Pn to 0 (zero) to suspend the discharge for the long term (step S28) and then proceeds to step 29. If determined in step S26 that the value of the SOC of the rechargeable battery 40 is not less than or equal to the value B of the second suspension SOC, the monitor unit 8 lowers the second upper limit value Pn by one step (step S27) and then proceeds to step S29.

In step S29, the monitor unit 8 determines whether or not the minimum terminal voltage Vu_min is less than or equal to the first limiting voltage $V_1$. If step S24 is performed, the monitor unit 8 determines whether or not the minimum terminal voltage Vu_min is less than or equal to the first limiting voltage $V\alpha$ in step S29. Step S29 is similar to step S9 of the first embodiment shown in FIG. 5.

If the minimum terminal voltage Vu_min is not less than or equal to the first limiting voltage $V_1$ (or $V\alpha$), the monitor unit 8 performs step S33. If the minimum terminal voltage Vu_min is less than or equal to the first limiting voltage $V_1$ (or $V\alpha$), the monitor unit 8 determines whether or not the value of the SOC of the rechargeable battery 40 estimated by the calculation unit 10 is less than or equal to the value A of the first suspension SOC (step S30). If step S24 is performed, the monitor unit 8 determines whether or not the value of the SOC of the rechargeable battery 40 is less than or equal to the value a of the first suspension SOC in step S30.

If determined in step S30 that the value of the SOC of the rechargeable battery 40 is less than or equal to the value A (or a) of the second suspension SOC, the monitor unit 8 sets the first upper limit value Pp to 0 (zero) to suspend the discharge for the short term (step S32). If determined in step S30 that the value of the SOC of the rechargeable battery 40 is not less than or equal to the value A (or a) of the first suspension SOC, the monitor unit 8 lowers the first upper limit value Pp by one step (step S31).

Subsequently, the communication unit 9 provides the short term output information and the long term output information to the vehicle ECU 20 (step S33) and terminates the processing. Step S33 is similar to step S13 of the first embodiment shown in FIG. 5. The processes of steps S21 to S33 shown in FIG. 8 are also performed at a constant cycle (e.g., 100 ms cycle) in the second embodiment.

In this manner, in the second embodiment, the value of the first suspension SOC is lowered from A to a when the engine is started, and the discharge suspension condition is moderated compared to normal states. As a result, the first upper limit value Pp is lowered only when the index (SOC of rechargeable battery 40) indicating the charged state of the rechargeable battery 40 satisfies the discharge suspension condition (lower limit value: a herein) which is more moderate than that for normal states. Therefore, the reliability for starting the engine under lower temperatures is enhanced in the second embodiment in the same manner as in the first embodiment. Since the power necessary for starting the engine is ensured by lowering the first suspension SOC, the engine is started without repeatedly activating and inactivating the starter motor 38. Thus, the deterioration of the rechargeable battery 40 is also suppressed in the second embodiment compared to the prior art in the same manner as in the first embodiment.

Although not shown in FIG. 8, the monitor unit 8 may determine whether or not the battery temperature of the rechargeable battery 40 is lower than or equal to a constant value (e.g. zero degrees) in step S23 of the second embodiment. In this case, step S24 is performed only under low temperatures. Thus, deterioration of the rechargeable battery 40 is further suppressed.

In the second embodiment, the programs embodying various processes shown in FIG. 8 are installed in the microcomputer, and the battery ECU 1 executes the programs installed in the microcomputer.

A third embodiment of the present invention will now be described with reference to FIG. 9.

The rechargeable battery subject to control in the third embodiment has the same configuration as the rechargeable battery 40 of the first embodiment shown in FIGS. 1 and 2. The controller for the rechargeable battery of the third embodiment, which is similar to the controller 1 for the rechargeable battery 40 of the first embodiment shown in FIGS. 1 and 2, is mounted on an HEV. To avoid redundancy, like or same reference numerals are given to those components that are the same as the corresponding components of the first embodiment.

In the third embodiment, the terminal voltage (block voltage) of the rechargeable battery 40 and the SOC of the rechargeable battery 40 are both used as indexes indicating the charged state of the rechargeable battery 40. The discharge is suspended when the terminal voltage and the SOC of the rechargeable battery 40 are both lowered to a predetermined value.

Specifically, in the third embodiment, the condition setting unit 7 sets the short term discharge suspension SOC (first suspension SOC) and the long term discharge suspension SOC (second suspension SOC) in addition to the short term discharge suspension voltage (first suspension voltage) $V_2$ and the long term discharge suspension voltage (second suspension voltage) $V_{12}$ as the trigger for suspending the discharge. The setting of the first suspension voltage $V_2$ and the second suspension voltage $V_{12}$ with the condition setting unit 7 is performed in the same manner as in the first embodiment. The setting of the first suspension SOC and the second suspension SOC by the condition setting unit 7 is performed in the same manner as in the second embodiment.

In the third embodiment, the monitor unit 8 lowers the first limiting voltage $V_1$, the first suspension voltage $V_2$ and the value of the first suspension SOC to enhance the reliability of the starting of the engine start under conditions in which it is difficult to start the engine, such as under low temperatures.

The output controlling method of the rechargeable battery 40 of the third embodiment will now be described with reference to FIG. 9. FIG. 9 is a flowchart showing the output controlling method of the rechargeable battery 40 of the third embodiment. The output controlling method of the rechargeable battery 40 in the third embodiment is performed by operating the battery ECU 1 (battery controller) of the third embodiment.

Figure 9:
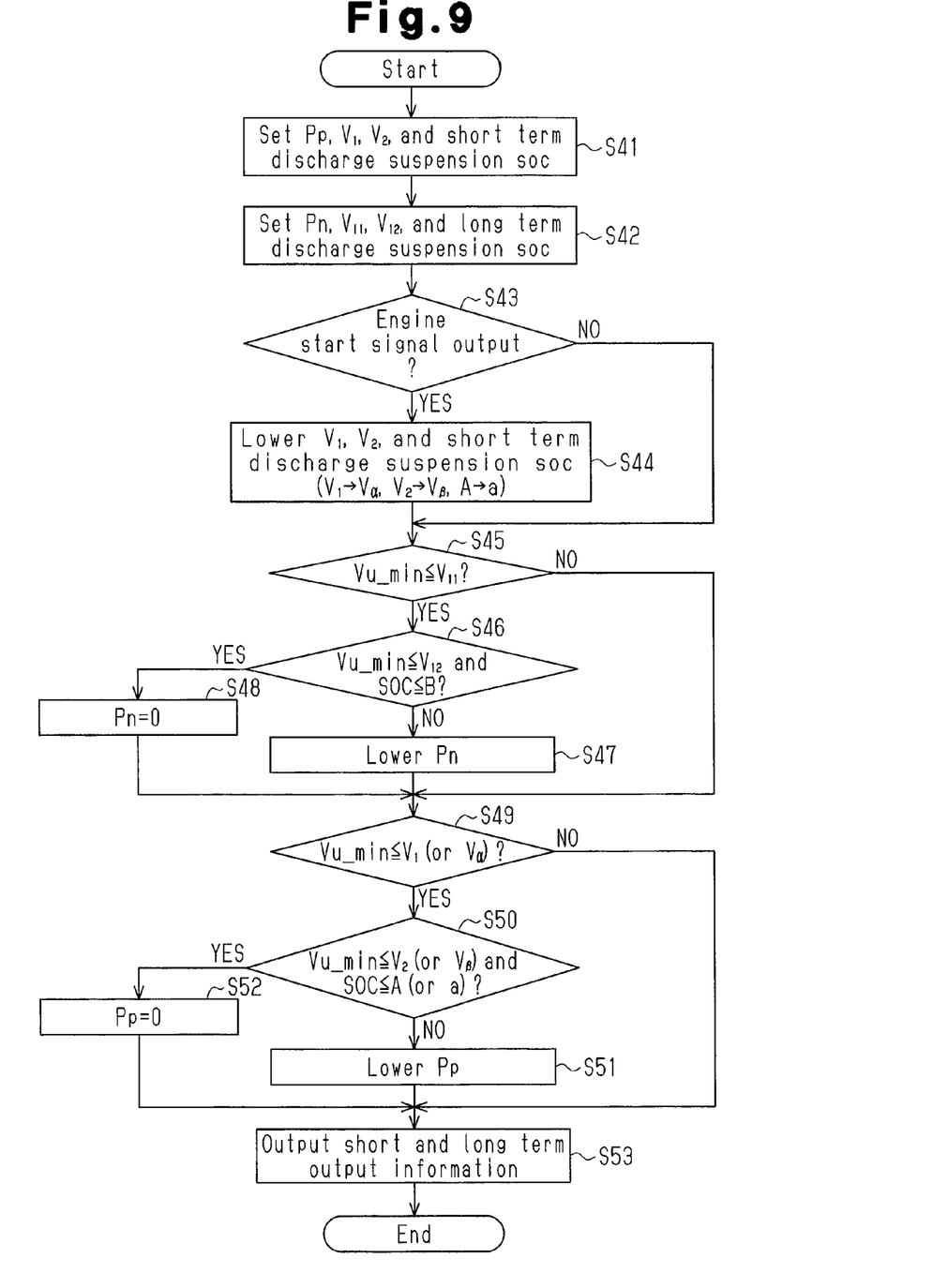
FIG. 9 is a flowchart showing an output controlling method of the rechargeable battery according to a third embodiment of the present invention.

As shown in FIG. 9, the condition setting unit 7 first sets the short term output upper limit value (first upper limit value) Pp, the short term discharge limiting voltage (first limiting voltage) $V_1$, the short term discharge suspension voltage (first suspension voltage) $V_2$, and the short term discharge suspension SOC (first suspension SOC) (step S41). The condition setting unit 7 also sets the long term output upper limit value (second upper limit value) Pn, the long term discharge limiting voltage (second limiting voltage) $V_{11}$, the long term discharge suspension voltage (second suspension voltage) $V_{12}$, and the long term discharge suspension SOC (second suspension SOC) (step S42). Steps S41 and S42 may be performed simultaneously or in a reversed order. Furthermore, the value of the first suspension SOC is set to A in step S41, and the value of the second suspension SOC is set to B in step S42.

The monitor unit 8 then determines whether or not the engine start signal is output from the vehicle ECU 20 (step S43). Step S43 is similar to step S3 of the first embodiment shown in FIG. 5.

If the engine start signal is output, the monitor unit 8 lowers the first limiting voltage $V_1$ and the first suspension voltage $V_2$, and further lowers the value of the first suspension SOC from A to a (step S44). The monitor unit 8 thereafter performs step S45. If the engine start signal is not output, the monitor unit 8 performs step S45 without lowering the first limiting voltage $V_1$, the first suspension voltage $V_2$, and the first suspension SOC. The lowered first limiting voltage is set as the "first limiting voltage $V\alpha$", and the lowered first suspension voltage is set as the "first suspension voltage $V\beta$".

In step S45, the monitor unit 8 determines whether or not the minimum terminal voltage Vu_min is less than or equal to the second limiting voltage $V_{11}$. If the minimum terminal voltage Vu_min is not less than or equal to the second limiting voltage $V_{11}$, the monitor unit 8 performs step S49. If the minimum terminal voltage Vu_min is less than or equal to the second limiting voltage $V_{11}$, the monitor unit 8 determines whether or not the minimum terminal voltage Vu_min is less than or equal to the second suspension voltage $V_{12}$, and whether or not the value of the SOC of the rechargeable battery 40 is less than or equal to the value B of the second suspension SOC (step S46).

If it is determined in step S46 that the minimum terminal voltage Vu_min is less than or equal to the second suspension voltage $V_{12}$ and the value of the SOC of the rechargeable battery 40 is less than or equal to the value B of the second suspension SOC, the monitor unit 8 sets the second upper limit value Pn to 0 (zero) to suspend the discharge for a long term (step S48). The monitor unit 8 then performs step S49.

If it is determined in step S46 that the minimum terminal voltage Vu_min is not less than or equal to the second suspension voltage $V_{12}$ and the value of the SOC of the rechargeable battery 40 is not less than or equal to the value B of the second suspension SOC, the monitor unit 8 lowers the second upper limit value Pn by one step (step S47). The monitor unit 8 then performs step S49.

In step S49, the monitor unit 8 determines whether or not the minimum terminal voltage Vu_min is less than or equal to the first limiting voltage $V_1$. If step S44 is performed, the monitor unit 8 determines whether or not the minimum terminal voltage Vu_min is less than or equal to the first limiting voltage Vα in step S49. Step S49 is similar to step S9 of the first embodiment shown in FIG. 5.

If the minimum terminal voltage Vu_min is not less than or equal to the first limiting voltage $V_1$ (or Vα), the monitor unit 8 performs step S53. If the minimum terminal voltage Vu_min is less than or equal to the first limiting voltage $V_1$ (or Vα), the monitor unit 8 determines whether or not the minimum terminal voltage Vu_min is less than or equal to the first suspension voltage $V_2$ and whether or not the value of the SOC of the rechargeable battery 40 is less than or equal to the value A of the first suspension SOC (step S50). If step S44 is performed, the monitor unit 8 determines whether or not the minimum terminal voltage Vu_min is less than or equal to the first suspension voltage Vβ and whether or not the value of the SOC of the rechargeable battery 40 is less than or equal to the value a of the first suspension SOC in step S50.

If determined in step S50 that the minimum terminal voltage Vu_min is less than or equal to the first suspension voltage $V_2$ (or Vβ) and the value of the SOC of the rechargeable battery 40 is less than or equal to the value A (or a) of the first suspension SOC, the monitor unit 8 sets the first upper limit value Pp to 0 (zero) (step S52).

If determined in step S50 that the minimum terminal voltage Vu_min is not less than or equal to the first suspension voltage $V_2$ (or Vβ) and the value of the SOC of the rechargeable battery 40 is not less than or equal to the value A (or a) of the first suspension SOC, the monitor unit 8 lowers the first upper limit value Pp by one step (step S51).

Subsequently, the communication unit 9 provides the short term output information and the long term output information to the vehicle ECU 20 (step S53) and ends the processing. Step S53 is similar to step S13 of the first embodiment shown in FIG. 5. The processes steps S41 to S53 shown in FIG. 9 are also performed in constant cycles (e.g., 100 ms cycles) in the third embodiment.

In this manner, the discharge suspension condition (lower limit value) is moderated when the engine is started in the third embodiment. The reliability for starting the engine under low temperatures is enhanced in the same manner as the first and second embodiments. Furthermore, since the power necessary for starting the engine is also ensured in the third embodiment, the engine is started without repeatedly activating and inactivating the starter motor 38. The deterioration of the rechargeable battery 40 is also more suppressed compared to the prior art in the same manner as the first and second embodiments.

Although not shown in FIG. 9, the monitor unit 8 may determine whether or not the battery temperature of the rechargeable battery 40 is lower than or equal to a constant value (e.g., zero degree) in step S43 of the third embodiment. In this case, step S44 is performed only under low temperatures. Thus, deterioration of the rechargeable battery 40 is further suppressed.

In the third embodiment as well, the programs embodying various processes shown in FIG. 9 are installed in the microcomputer, and the battery ECU 1 executes the programs installed in the microcomputer.

The rechargeable battery subject to control in the present invention is not limited to the rechargeable battery 40 for supplying power to the motor used to move the vehicle as in the first to the third embodiments. The rechargeable battery subject to control in the present invention includes any kind of rechargeable battery mounted on a vehicle to supply power to the starter motor.

The device and method for controlling the output of a rechargeable battery in the present invention are effective for a rechargeable battery that supplies power to the starter motor of the vehicle. That is, the present invention is not limited to an HEV and is also effective for a typical engine automobile. The device and method for controlling the output of a rechargeable battery in the present invention have industrial applicability.

It should be apparent to those skilled in the art that the present invention may be embodied in many other specific forms without departing from the spirit or scope of the invention. Therefore, the present examples and embodiments are to be considered as illustrative and not restrictive, and the invention is not to be limited to the details given herein, but may be modified within the scope and equivalence of the appended claims.

What is claimed is:

1. A controller for a rechargeable battery mounted on a vehicle using an engine as a power source, the vehicle including a starter motor for starting the engine and a vehicle controller for controlling the starter motor by repeatedly stopping and starting discharge of the rechargeable battery when an index indicating a charged state of the rechargeable battery satisfies a discharge suspension condition, the controller comprising:
   a control unit that when operated:
      instructs the vehicle controller to stop discharging the rechargeable battery when the index indicating the charged state of the rechargeable battery satisfies the discharge suspension condition, and
      temporarily moderates the discharge suspension condition to suppress repeatedly stopping and starting discharge of the rechargeable battery when the rechargeable battery is expected to supply power to the starter motor,
      wherein the control unit instructs the vehicle controller to stop discharging the rechargeable battery when the index indicating the charged state of the rechargeable battery satisfies the moderated discharge suspension condition when the rechargeable battery is expected to supply power to the starter motor.

2. The controller according to claim 1, wherein:
the index indicating the charged state of the rechargeable battery includes terminal voltage of the rechargeable battery;
the discharge suspension condition a lower limit value for the terminal voltage of the rechargeable battery; and
the control unit lowers the lower limit value of the terminal voltage to moderate the discharge suspension condition.

3. The controller according to claim 1, wherein:
the index indicating the charged state of the rechargeable battery includes a state of charge of the rechargeable battery;
the discharge suspension condition includes a lower limit value for the state of charge of the rechargeable battery; and
the control unit lowers the lower limit value of the state of charge to moderate the discharge suspension condition.

4. The controller according to claim 1, wherein:
the index indicating the charged state of the rechargeable battery includes terminal voltage and state of charge of the rechargeable battery;
the discharge suspension condition includes lower limit values for the terminal voltage and state of charge of the rechargeable battery; and
the control unit lowers the lower limit values of the terminal voltage and state of charge of the rechargeable battery to moderate the discharge suspension condition.

5. The controller according to claim 1, wherein:
the rechargeable battery has a temperature; and
the control unit moderates the discharge suspension condition if the temperature of the rechargeable battery is lower than or equal to a predetermined temperature when the rechargeable battery is expected to supply power to the starter motor.

6. The controller according to claim 1, wherein the control unit includes a monitor unit for changing the discharge suspension condition so as to continue discharging the rechargeable battery when the rechargeable battery is expected to supply power to the starter motor.

7. The controller according to claim 1, wherein:
the control unit includes a setting unit for setting a first upper limit value and a second upper limit value, which is lower than the first upper limit value, for power discharged from the rechargeable battery within a predetermined time;
the discharge suspension condition includes a first condition for generating an instruction based on the first upper limit value to stop discharging the rechargeable battery and a second condition for generating an instruction based on the second upper limit value to stop discharging the rechargeable battery; and
the control unit moderates at least the first condition.

8. The controller according to claim 7, wherein the first upper limit value is set to be higher than the power required to be discharged when starting the engine.

9. The controller according to claim 7, wherein the control unit moderates the first condition during a period in which an engine start signal provided from the vehicle controller to the rechargeable battery controller is active.

* * * * *